(12) United States Patent
Choi et al.

(10) Patent No.: US 12,355,998 B2
(45) Date of Patent: *Jul. 8, 2025

(54) METHOD FOR LAYERWISE RANDOM ACCESS IN A CODED VIDEO STREAM

(71) Applicant: TENCENT AMERICA LLC, Palo Alto, CA (US)

(72) Inventors: Byeongdoo Choi, Palo Alto, CA (US); Shan Liu, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 18/209,169

(22) Filed: Jun. 13, 2023

(65) Prior Publication Data
US 2023/0328265 A1    Oct. 12, 2023

Related U.S. Application Data

(63) Continuation of application No. 17/546,780, filed on Dec. 9, 2021, now Pat. No. 11,765,373, which is a
(Continued)

(51) Int. Cl.
*H04N 19/172* (2014.01)
*H04N 19/129* (2014.01)
(Continued)

(52) U.S. Cl.
CPC .......... *H04N 19/46* (2014.11); *H04N 19/129* (2014.11); *H04N 19/159* (2014.11); *H04N 19/172* (2014.11); *H04N 19/188* (2014.11)

(58) Field of Classification Search
CPC .... H04N 19/46; H04N 19/129; H04N 19/159; H04N 19/172; H04N 19/188; H04N 19/70; H04N 19/30
See application file for complete search history.

(56) References Cited

U.S. PATENT DOCUMENTS

2014/0301437 A1* 10/2014 Wang .................. H04N 19/107
375/240.02
2014/0301485 A1* 10/2014 Ramasubramonian .....................
H04N 19/30
375/240.27
(Continued)

FOREIGN PATENT DOCUMENTS

JP          2017-225159 A      12/2017
WO     WO-2016034058 A1 *  3/2016  ........... H04N 19/105
WO     WO-2020058893 A1 *  3/2020  ........... H04N 19/105

OTHER PUBLICATIONS

Bross et al., (hereinafter Bross): Versatile Video Coding—Draft 7-: JVET-P2001-vE; Geneva, CH, Oct. 2019 (Year: 2019).*
(Continued)

*Primary Examiner* — Dramos Kalapodas
(74) *Attorney, Agent, or Firm* — ArentFox Schiff LLP

(57) ABSTRACT

A method of generating an encoded video bitstream, including obtaining an IRAP AU from a video bitstream; determining whether the IRAP AU is a first AU in a decoding order, whether each picture is an IDR picture, or whether each picture is a first picture of a layer following an EOS NAL unit; if so, setting a first flag for the IRAP AU equal to one; if not, determining whether a second flag for the IRAP AU is externally set to an external value; if so, setting the first flag for the IRAP AU equal to the external value; and if not, setting the first flag for the IRAP AU and the second flag for the IRAP AU equal to zero; encoding the video bitstream based on the first flag and the second flag; and transmitting the encoded video bitstream.

20 Claims, 10 Drawing Sheets

Related U.S. Application Data continuation of application No. 17/063,082, filed on Oct. 5, 2020, now Pat. No. 11,228,777.

(60) Provisional application No. 62/954,880, filed on Dec. 30, 2019.

(51) Int. Cl.
    *H04N 19/159* (2014.01)
    *H04N 19/169* (2014.01)
    *H04N 19/46* (2014.01)

(56) References Cited

U.S. PATENT DOCUMENTS

| | | | |
|---|---|---|---|
| 2015/0271506 A1* | 9/2015 | Hendry | H04N 19/46 375/240.26 |
| 2016/0088306 A1 | 3/2016 | Sjoberg et al. | |
| 2017/0105004 A1 | 4/2017 | Chen et al. | |
| 2022/0217369 A1* | 7/2022 | Wang | H04N 19/103 |
| 2022/0217386 A1* | 7/2022 | Wang | H04N 19/107 |

OTHER PUBLICATIONS

Ye-Kui Wang, "AHG8: Scalability—general and output layer sets", Joint Video Experts Team (JVET) of ITU-T SG 16 WP 3 and ISO/IEC JTC 1/SC 29/WG 11, JVET-P0115-v2, 16th Meeting, Geneva, CH, Oct. 1-11, 2019 (6 pages).

Benjamin Bross et al., "Versatile Video Coding (Draft 5)", Joint Video Experts Team (JVET) of ITU-T SG 16 WP 3 and ISO/IEC JTC 1/SC 29/WG 11, 2019, JVET-N1001-v10, 14th Meeting: Geneva. CH, Mar. 19-27 (12 pages total).

Benjamin Bross et al., "Versatile Video Coding (Draft 6)", Joint Video Experts Team (JVET) of ITU-T SG 16 WP 3 and IS O/IEC JTC 1/SC 29/WG 11, 15th Meeting: Gothenburg, SE, Jul. 3-12, 2019, 455 pages.

International Search Report dated Jan. 27, 2021 in International Application No. PCT/US2020/054972.

Lotter et al., "Deep Predictive Coding Networks for Video Prediction and Unsupervised Learning", arViv proprint, Mar. 1, 2017, Retrieved on Dec. 19, 2020, https://arxiv.org/pdf/1605.08104.pdf (18 pages total).

Office Action dated Nov. 22, 2022 issued by the Japanese Patent Office in Japanese Application No. 2021-557674.

Written Opinion of the International Searching Authority dated Jan. 27, 2021 in International Application No. PCT/US2020/054972.

Office Action dated Jun. 28, 2023 from the Korean Patent Office in Application No. 10-2021-7023757.

Benjamin Bross et al., "Versatile Video Coding (Draft 7)", Joint Video Experts Team (JVET) of ITU-T SG 16 WP 3 and ISO/IEC JTC 1/SC 29/WG 11, Document: JVET-P2001-vE, 16th Meeting: Geneva, CH, Oct. 1-11, 2019, pp. 1-465 (489 total pages).

\* cited by examiner

FIG. 4   Encoder 203

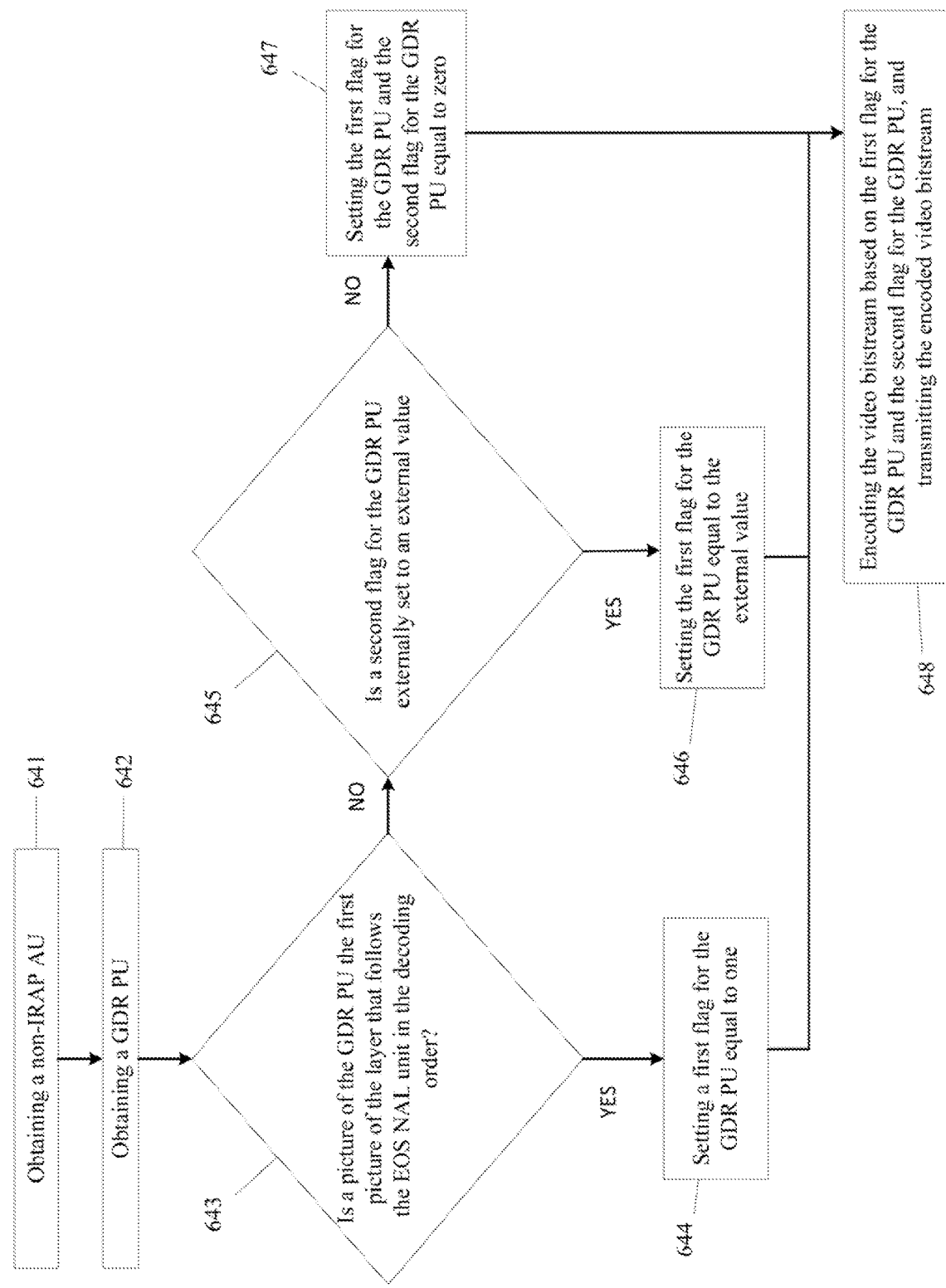

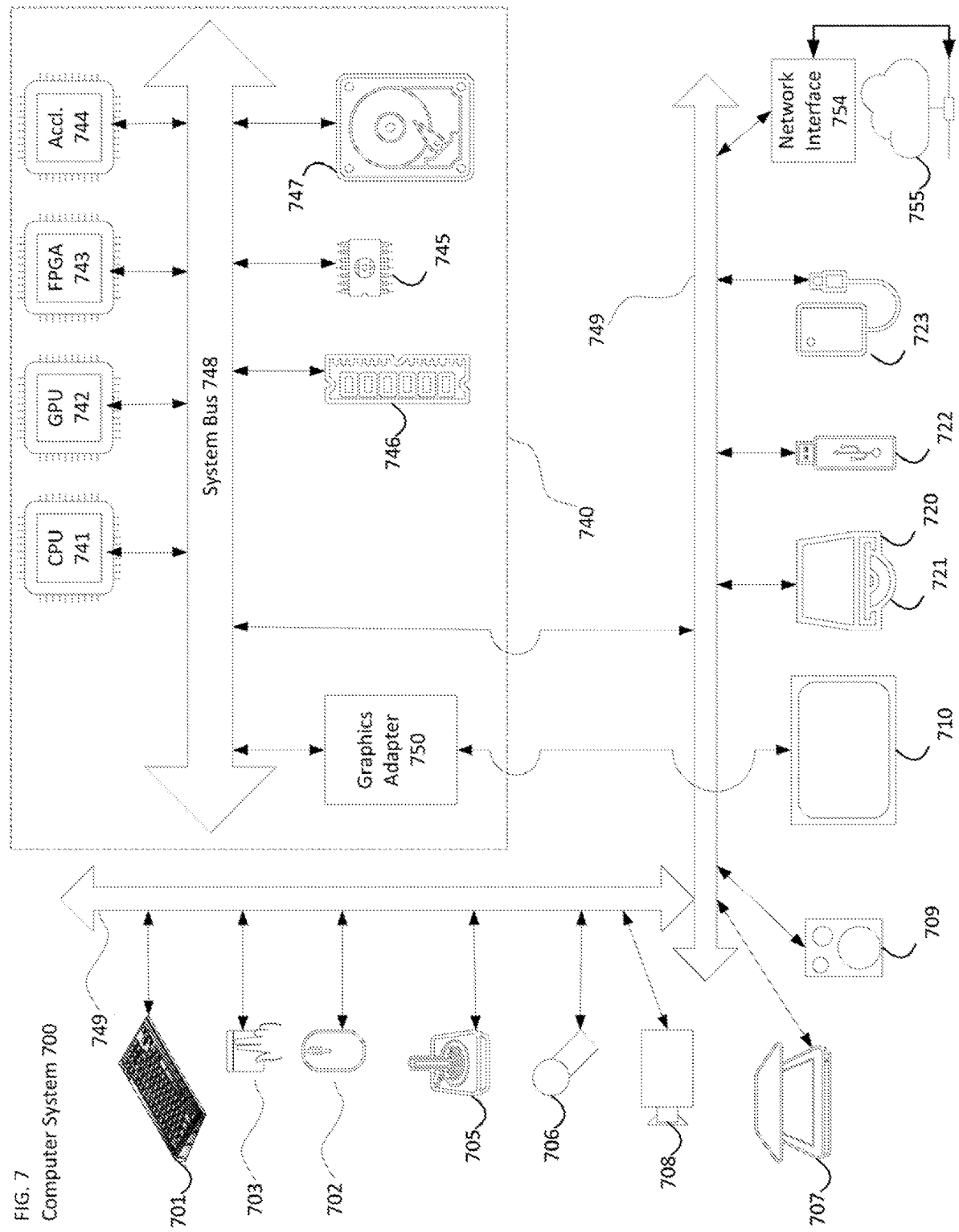

METHOD FOR LAYERWISE RANDOM ACCESS IN A CODED VIDEO STREAM

CROSS-REFERENCE TO RELATED APPLICATION

This application is a continuation of U.S. patent application Ser. No. 17/546,780, filed on Dec. 9, 2021, which claims priority to U.S. patent application Ser. No. 17/063,082, filed on Oct. 5, 2020, which claims priority from 35 U.S.C. § 119 to U.S. Provisional Application No. 62/954,880, filed on Dec. 30, 2019, in the United States Patent & Trademark Office, the disclosure of which are incorporated herein by reference in their entirety.

FIELD

The disclosed subject matter relates to video coding and decoding, and more specifically, to setting flags while generating an encoded video bitstream.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

In an embodiment, there is provided a method of generating an encoded video bitstream using at least one processor, including obtaining an intra random access point (IRAP) access unit (AU) from a video bitstream; determining whether the IRAP AU is a first AU in a decoding order, whether each picture included in the IRAP AU is an instantaneous decoder refresh (IDR) picture, and whether the each picture included in the IRAP AU is a first picture of a layer that follows an end of sequence (EOS) network abstraction layer (NAL) unit in the decoding order; based on determining that the IRAP AU is the first AU in the decoding order of the video bitstream, determining that the each picture included in the IRAP AU is the IDR picture, or determining that the each picture included in the IRAP AU is the first picture of the layer that follows the EOS NAL unit in the decoding order, setting a first flag for the IRAP AU equal to one; based on determining that the IRAP AU is not the first AU in the decoding order, determining that the each picture included in the IRAP AU is not an IDR picture, and determining that the each picture included in the IRAP AU is not the first picture of the layer that follows the EOS NAL unit in the decoding order, determining whether a second flag for the IRAP AU is externally set to an external value; based on determining that the IRAP AU is not the first AU in the decoding order, determining that the each picture included in the IRAP AU is not the IDR picture, determining that the each picture included in the IRAP AU is not the first picture of the layer that follows the EOS NAL unit in the decoding order, and determining that the second flag for the IRAP AU is externally set to the external value, setting the first flag for the IRAP AU equal to the external value; and based on the determining that the IRAP AU is not the first AU in the decoding order, the determining that the each picture included in the IRAP AU is not the IDR picture, the determining that the each picture included in the IRAP AU is not the first picture of the layer that follows the EOS NAL unit in the decoding order, and determining that the second flag is not externally set to the external value, setting the first flag for the IRAP AU equal to zero and setting the second flag for the IRAP AU equal to zero; encoding the video bitstream based on the first flag for the IRAP AU and the second flag for the IRAP AU; and transmitting the encoded video bitstream.

In an embodiment, there is provided a device for generating an encoded video bitstream, including at least one memory configured to store program code; and at least one processor configured to read the program code and operate as instructed by the program code, the program code including: first obtaining code configured to cause the at least one processor to obtain an intra random access point (IRAP) access unit (AU) from a video bitstream; first determining code configured to cause the at least one processor to determine whether the IRAP AU is a first AU in a decoding order, whether each picture included in the IRAP AU is an instantaneous decoder refresh (IDR) picture, and whether the each picture included in the IRAP AU is a first picture of a layer that follows an end of sequence (EOS) network abstraction layer (NAL) unit in the decoding order; first setting code configured to cause the at least one processor to, based on determining that the IRAP AU is the first AU in the decoding order of the video bitstream, determining that the each picture included in the IRAP AU is the IDR picture, or determining that the each picture included in the IRAP AU is the first picture of the layer that follows the EOS NAL unit in the decoding order, set a first flag for the IRAP AU equal to one; second determining code configured to cause the at least one processor to, based on determining that the IRAP AU is not the first AU in the decoding order, determining that the each picture included in the IRAP AU is not an IDR picture, and determining that the each picture included in the IRAP AU is not the first picture of the layer that follows the EOS NAL unit in the decoding order, determine whether a second flag for the IRAP AU is externally set to an external value; second setting code configured to cause the at least one processor to, based on determining that the IRAP AU is not the first AU in the decoding order, determining that the each picture included in the IRAP AU is not the IDR picture, determining that the each picture included in the IRAP AU is not the first picture of the layer that follows the EOS NAL unit in the decoding order, and determining that the second flag for the IRAP AU is externally set to the external value, set the first flag for the IRAP AU equal to the external value; and third setting code configured to cause the at least one processor to, based on the determining that the IRAP AU is not the first AU in the decoding order, the determining that the each picture included in the IRAP AU is not the IDR picture, the determining that the each picture included in the IRAP AU is not the first picture of the layer that follows the EOS NAL unit in the decoding order, and determining that the second flag is not externally set to the external value, set the first flag for the IRAP AU equal to zero and set the second flag for the IRAP AU equal to zero; encoding configured to cause the at least one processor to encode the video bitstream based on the first flag for the IRAP AU and the second flag for the IRAP AU; and transmitting configured to cause the at least one processor to transmit the encoded video bitstream.

In an embodiment, there is provided a non-transitory computer-readable medium storing instructions, including one or more instructions that, when executed by one or more processors of a device for generating an encoded video bitstream, cause the one or more processors to: obtain an intra random access point (IRAP) access unit (AU) from a video bitstream; determine whether the IRAP AU is a first AU in a decoding order, whether each picture included in the IRAP AU is an instantaneous decoder refresh (IDR) picture, and whether the each picture included in the IRAP AU is a first picture of a layer that follows an end of sequence (EOS) network abstraction layer (NAL) unit in the decoding order; based on determining that the IRAP AU is the first AU in the decoding order of the video bitstream, determining that the each picture included in the IRAP AU is the IDR picture, or determining that the each picture included in the IRAP AU is the first picture of the layer that follows the EOS NAL unit in the decoding order, set a first flag for the IRAP AU equal to one; based on determining that the IRAP AU is not the first AU in the decoding order, determining that the each picture included in the IRAP AU is not an IDR picture, and determining that the each picture included in the IRAP AU is not the first picture of the layer that follows the EOS NAL unit in the decoding order, determine whether a second flag for the IRAP AU is externally set to an external value; based on determining that the IRAP AU is not the first AU in the decoding order, determining that the each picture included in the IRAP AU is not the IDR picture, determining that the each picture included in the IRAP AU is not the first picture of the layer that follows the EOS NAL unit in the decoding order, and determining that the second flag for the IRAP AU is externally set to the external value, set the first flag for the IRAP AU equal to the external value; and based on the determining that the IRAP AU is not the first AU in the decoding order, the determining that the each picture included in the IRAP AU is not the IDR picture, the determining that the each picture included in the IRAP AU is not the first picture of the layer that follows the EOS NAL unit in the decoding order, and determining that the second flag is not externally set to the external value, set the first flag for the IRAP AU equal to zero and set the second flag for the IRAP AU equal to zero; encode the video bitstream based on the first flag for the IRAP AU and the second flag for the IRAP AU; and transmit the encoded video bitstream.

BRIEF DESCRIPTION OF THE DRAWINGS

Further features, the nature, and various advantages of the disclosed subject matter will be more apparent from the following detailed description and the accompanying drawings in which:

FIGS. 6A-6D are a flowcharts of example processes for generating an encoded video bitstream in accordance with embodiments.

FIG. 7 is a schematic illustration of a computer system in accordance with an embodiment.

DETAILED DESCRIPTION

Figure 1:
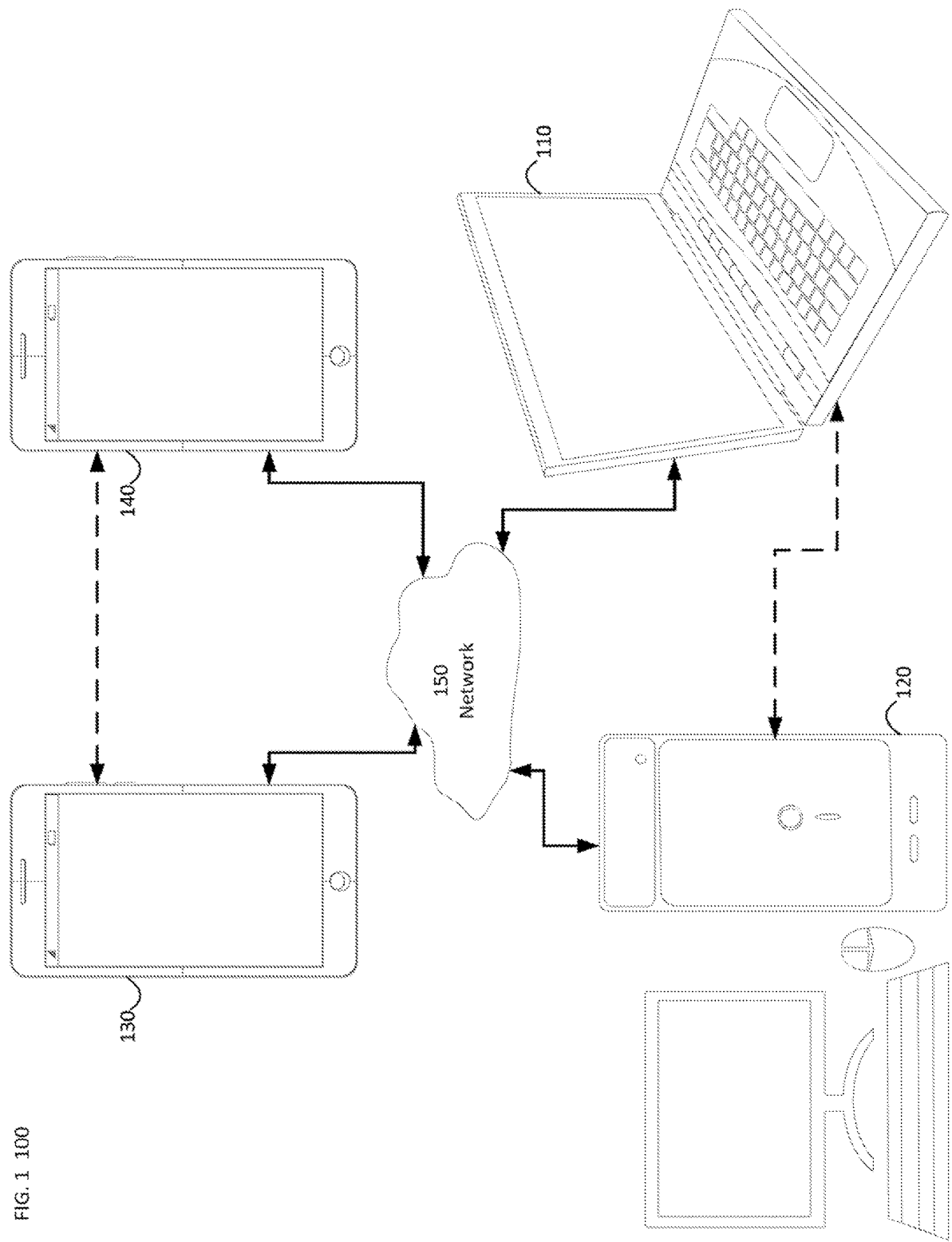
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
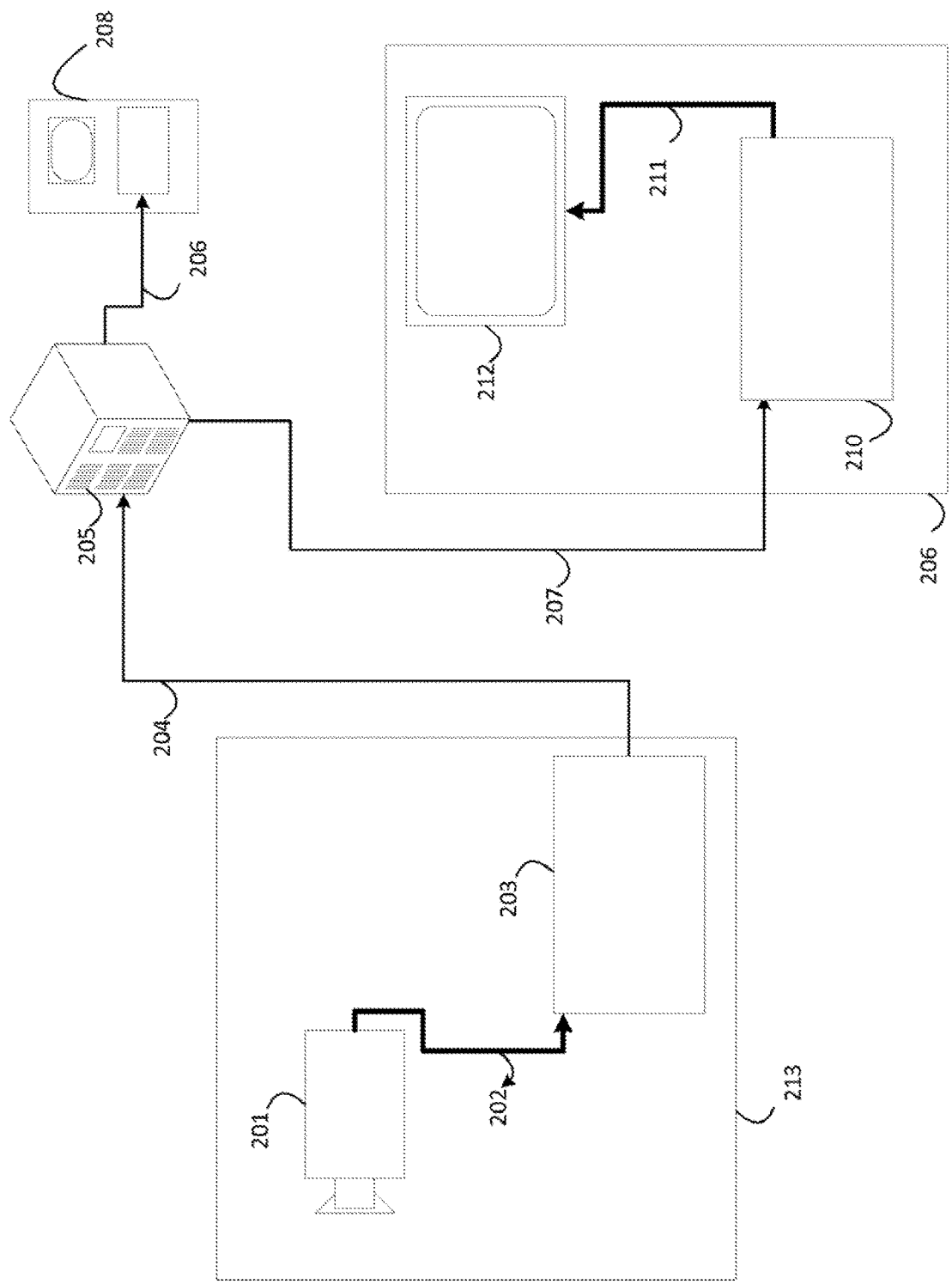
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
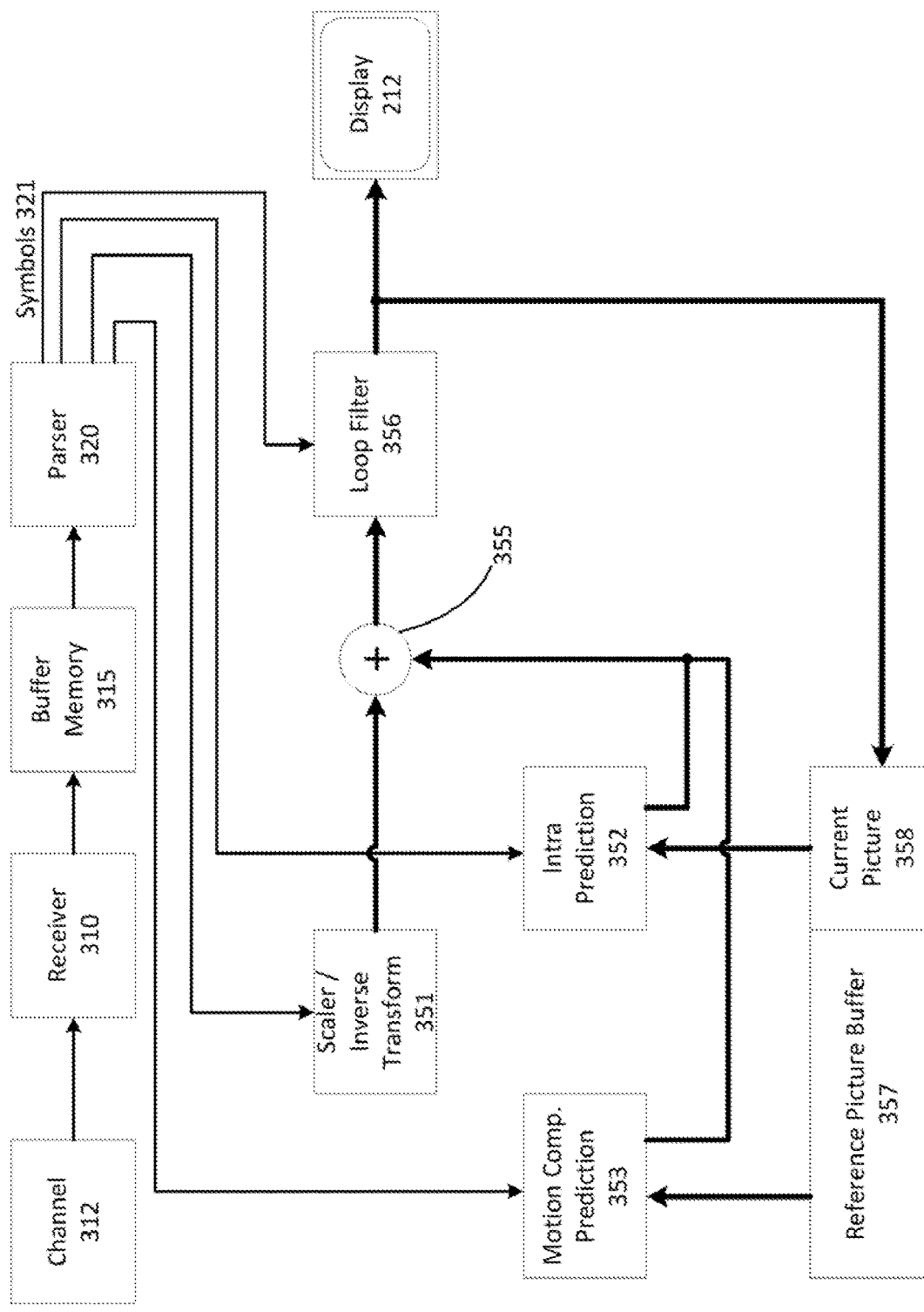
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
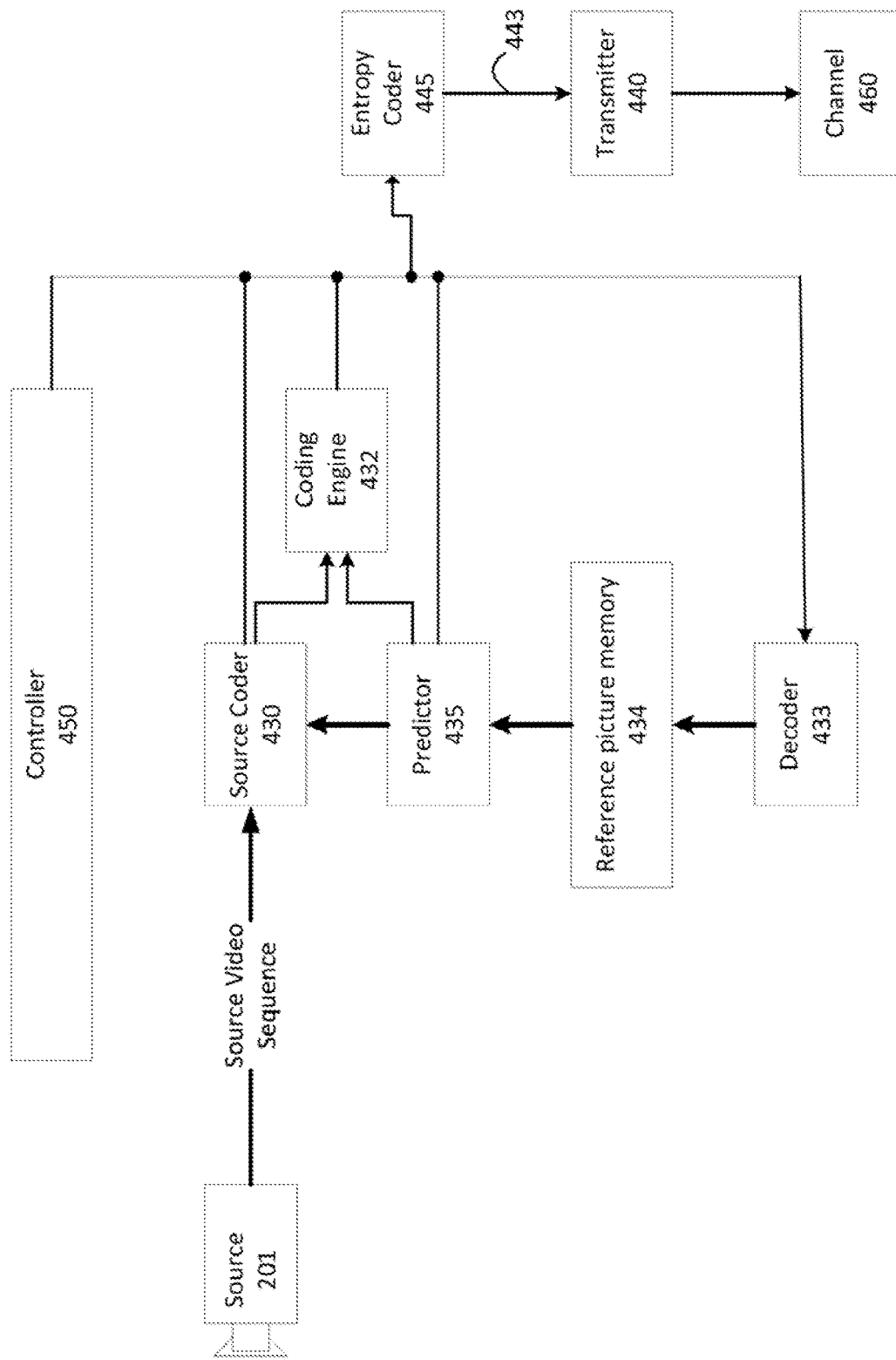
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Embodiments may relate to fixing a bug involving flags (HandleCraAsCvsStartFlag, HandleGdrAsCvsStartFlag and NoIncorrectPicOutputFlag) in a non-IRAP AU, and to making the support of the layer-wise random access clear in VVC. For example, in embodiments, the values of HandleCraAsCvsStartFlag, HandleGdrAsCvsStartFlag and NoIncorrectPicOutputFlag may be set equal to 0, by default, for each non-IRAP AU. In addition, in embodiments, the values of HandleCraAsCvsStartFlag, HandleGdrAsCvsStartFlag and NoIncorrectPicOutputFlag are manipulated for each (IRAP) PU (for each layer).

In the current VVC specification draft JVET-P2001 (editorially updated by JVET-Q0041), a coded video sequence (CVS) may start with an intra random access point (IRAP) access unit (AU), in which there is a picture unit (PU) for each layer in the CVS and the coded picture in each PU is an IRAP picture. For each IRAP AU, the values of HandleCraAsCvsStartFlag and NoIncorrectPicOutputFlag are set, to deal with the associated RASL pictures, which are not available when decoding. For each gradual decoding refresh (GDR) AU, the values of HandleGdrAsCvsStartFlag and NoIncorrectPicOutputFlag are set, similarly.

Figure 5:
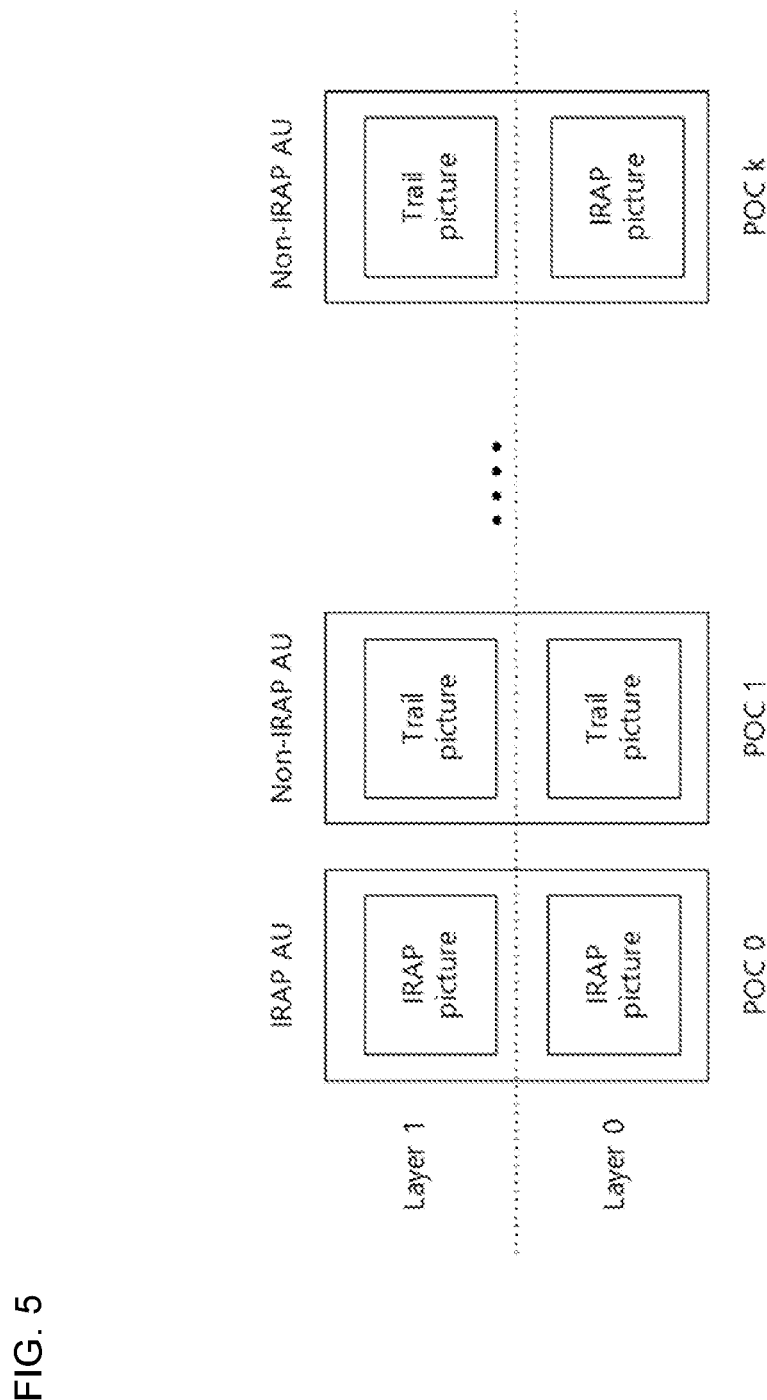
FIG. 5 illustrates an example of a bitstream structure in which a non-IRAP AU contains an IRAP PU, in which the coded picture is an IRAP picture, in accordance with an embodiment.

On the other hand, the VVC draft allows that a non-IRAP AU contains an IRAP PU, in which the coded picture is an IRAP picture. FIG. 5 illustrates an example of such a situation. However, the values of HandleCraAsCvsStartFlag, HandleGdrAsCvsStartFlag and NoIncorrectPicOutputFlag are not set equal to specific values in a non-IRAP AU. Those flags are set equal to specific values only when the current AU is an IRAP AU, and do not have default values. So, the flags are referred to without the value setting, when an IRAP PU in a non-IRAP AU is decoded. This a bug in the current specification.

In addition, to support a layer-wise random access, it is possible to perform random access at the position of an IRAP PU by discarding all PUs before the IRAP PU in the current VVC specification. To enable such a layer-wise random access by removing some prior PUs before the IRAP PU in a non-IRAP AU, the values of HandleCraAsCvsStartFlag, HandleGdrAsCvsStartFlag and NoIncorrectPicOutputFlag may be manipulated for each IRAP PU of each layer.

Embodiments may relate to fixing the bug discussed above with flags (HandleCraAsCvsStartFlag, HandleGdrAsCvsStartFlag and NoIncorrectPicOutputFlag) in a non-IRAP AU, and to making the support of the layer-wise random access clear in VVC.

For example, in embodiments, values of HandleCraAsCvsStartFlag, HandleGdrAsCvsStartFlag and NoIncorrectPicOutputFlag may be set equal to 0, by default, for each non-RAP AU. In addition, in embodiments, values of HandleCraAsCvsStartFlag, HandleGdrAsCvsStartFlag and NoIncorrectPicOutputFlag may be manipulated for each IRAP PU.

In embodiments, for each IRAP AU in the bitstream, the following may apply. If the AU is the first AU in the bitstream in decoding order, each picture is an instantaneous decoder refresh (IDR) picture, or each picture is the first picture of the layer that follows an end of sequence (EOS) network abstraction layer (NAL) unit in decoding order, the variable NoIncorrectPicOutputFlag is set equal to 1. Otherwise, if some external process is available to set the variable HandleCraAsCvsStartFlag to a value for the AU, HandleCraAsCvsStartFlag is set equal to the value provided by the external process and NoIncorrectPicOutputFlag is set equal to HandleCraAsCvsStartFlag. Otherwise, HandleCraAsCvsStartFlag and NoIncorrectPicOutputFlag are both set equal to 0.

For each IRAP AU in the bitstream, HandleCraAsCvsStartFlag and NoIncorrectPicOutputFlag may both be set equal to 0.

In embodiments, for each GDR AU in the bitstream, the following may apply. If the AU is the first AU in the bitstream in decoding order or each picture is the first picture of the layer that follows an EOS NAL unit in decoding order, the variable NoIncorrectPicOutputFlag may be set equal to 1. Otherwise, if some external process is available to set the variable HandleGdrAsCvsStartFlag to a value for the AU, HandleGdrAsCvsStartFlag may be set equal to the value provided by the external process and NoIncorrectPicOutputFlag may be set equal to HandleGdrAsCvsStartFlag. Otherwise, HandleGdrAsCvsStartFlag and NoIncorrectPicOutputFlag may both be set equal to 0.

The above operations, for both IRAP pictures and GDR pictures, may be used for identification of the CVSs in the bitstream.

In embodiments, for each AU in the bitstream, the following may apply. If the AU is the first AU in the bitstream in decoding order, each picture is an IDR picture, or each picture is the first picture of the layer that follows an EOS NAL unit in decoding order, the variable NoIncorrectPicOutputFlag may be set equal to 1. Otherwise, if some external process is available to set the variable HandleCraAsCvsStartFlag to a value for the IRAP AU, HandleCraAsCvsStartFlag may be set equal to the value provided by the external process and NoIncorrectPicOutputFlag is set equal to HandleCraAsCvsStartFlag. Otherwise, HandleCraAsCvsStartFlag and NoIncorrectPicOutputFlag may both be set equal to 0.

In embodiments, for each GDR AU in the bitstream, the following may apply. If the AU is the first AU in the bitstream in decoding order or each picture is the first picture of the layer that follows an EOS NAL unit in decoding order, the variable NoIncorrectPicOutputFlag may be set equal to 1. Otherwise, if some external process not is available to set the variable HandleGdrAsCvsStartFlag to a value for the AU, HandleGdrAsCvsStartFlag may be set equal to the value provided by the external process and NoIncorrectPicOutputFlag may be set equal to HandleGdrAsCvsStartFlag. Otherwise, HandleGdrAsCvsStartFlag and NoIncorrectPicOutputFlag may both be set equal to 0.

The above operations, for both IRAP pictures and GDR pictures, may be used for identification of the CVSs in the bitstream.

In embodiments, for each IRAP AU in the bitstream, the following may apply. If the AU is the first AU in the bitstream in decoding order, each picture is an IDR picture, or each picture is the first picture of the layer that follows an EOS NAL unit in decoding order, the variable NoIncorrectPicOutputFlag may be set equal to 1. Otherwise, if some external process is available to set the variable HandleCraAsCvsStartFlag to a value for the AU, HandleCraAsCvsStartFlag may be set equal to the value provided by the external process and NoIncorrectPicOutputFlag may be set equal to HandleCraAsCvsStartFlag. Otherwise, HandleCraAsCvsStartFlag and NoIncorrectPicOutputFlag may both be set equal to 0.

In embodiments each IRAP picture unit (PU) of an non-IRAP AU in the bitstream, the following may apply. If the picture of the IRAP PU is an IDR picture or the first picture of the layer that follows an EOS NAL unit in decoding order, the variable NoIncorrectPicOutputFlag for the IRAP PU may be set equal to 1. Otherwise, if some external process is available to set the variable HandleCraAsCvsStartFlag to a value for the IRAP PU, HandleCraAsCvsStartFlag may be set equal to the value provided by the external process and NoIncorrectPicOutputFlag may be set equal to HandleCraAsCvsStartFlag for the IRAP PU. Otherwise, HandleCraAsCvsStartFlag and NoIncorrectPicOutputFlag may both be set equal to 0 for the IRAP PU.

In embodiments, for each GDR AU in the bitstream, the following may apply. If the AU is the first AU in the bitstream in decoding order or each picture is the first picture of the layer that follows an EOS NAL unit in decoding order, the variable NoIncorrectPicOutputFlag may be set equal to 1. Otherwise, if some external process is available to set the variable HandleGdrAsCvsStartFlag to a value for the AU, HandleGdrAsCvsStartFlag may be set equal to the value provided by the external process and NoIncorrectPicOutputFlag may be set equal to HandleGdrAsCvsStartFlag. Otherwise, HandleGdrAsCvsStartFlag and NoIncorrectPicOutputFlag may both be set equal to 0.

In embodiments, for each GDR PU of an non-IRAP AU in the bitstream, the following may apply. If the picture of the GDR PU is the first picture of the layer that follows an EOS NAL unit in decoding order, the variable NoIncorrectPicOutputFlag may be set equal to 1. Otherwise, if some external process is available to set the variable HandleGdrAsCvsStartFlag to a value for the GDR PU, HandleGdrAsCvsStartFlag may be set equal to the value provided by the external process and NoIncorrectPicOutputFlag may be set equal to HandleGdrAsCvsStartFlag for the GDR PU. Otherwise, HandleGdrAsCvsStartFlag and NoIncorrectPicOutputFlag may both be set equal to 0 for the GDR PU.

FIGS. 6A-6D are flowchart is an example processes 600A, 600B, 600C, and 600D for generating an encoded video bitstream, according to embodiments. In embodiments, any of processes 600A, 600B, 600C, and 600D, or any portions of processes 600A, 600B, 600C, and 600D, may be combined in any combination or permutation and in any order as desired. In some implementations, one or more process blocks of FIGS. 6A-6D may be performed by decoder 210. In some implementations, one or more process blocks of FIGS. 6A-6D may be performed by another device or a group of devices separate from or including decoder 210, such as encoder 203.

Figure 6A:
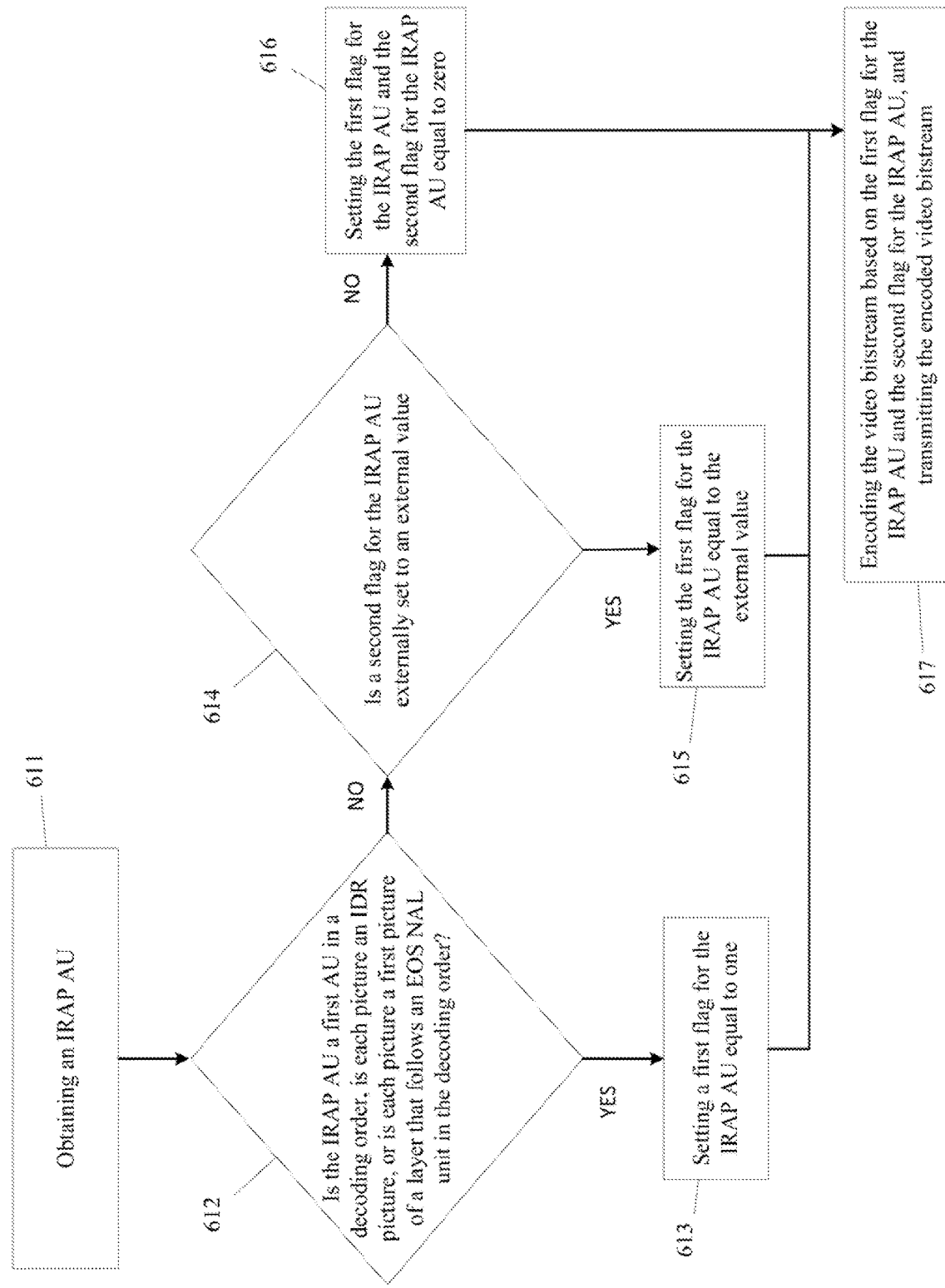

As shown in FIG. 6A, process 600A may include obtaining an intra random access point (IRAP) access unit (AU) from a video bitstream (block 611).

As further shown in FIG. 6A, process 600A may include determining whether the IRAP AU is a first AU in a decoding order, whether each picture included in the IRAP AU is an instantaneous decoder refresh (IDR) picture, and whether the each picture included in the IRAP AU is a first picture of a layer that follows an end of sequence (EOS) network abstraction layer (NAL) unit in the decoding order (block 612).

As further shown in FIG. 6A, if a result of any of the determinations in block 612 is yes (YES at block 612), process 600A may proceed to block 613. However, if a result of all of the determinations in block 612 is no (NO at block 612), process 600A may proceed to block 614.

As further shown in FIG. 6A, process 600A may include setting a first flag for the IRAP AU equal to one (block 613).

As further shown in FIG. 6A, process 600A may include determining whether a second flag for the IRAP AU is externally set to an external value (block 614).

As further shown in FIG. 6A, if the second flag for the IRAP AU is determined to be externally set to the external value (YES at block 614), process 600A may proceed to block 615. However, if the second flag for the IRAP AU is determined not to be externally set to the external value (NO at block 614), process 600A may proceed to block 616.

As further shown in FIG. 6A, process 600A may include setting the first flag for the IRAP AU equal to the external value (block 615).

As further shown in FIG. 6A, process 600A may include setting the first flag for the IRAP AU and the second flag for the IRAP AU equal to zero (block 616).

As further shown in FIG. 6A, process 600A may include encoding the video bitstream based on the first flag for the IRAP AU and the second flag for the IRAP AU, and transmitting the encoded video bitstream (block 617).

Figure 6B:
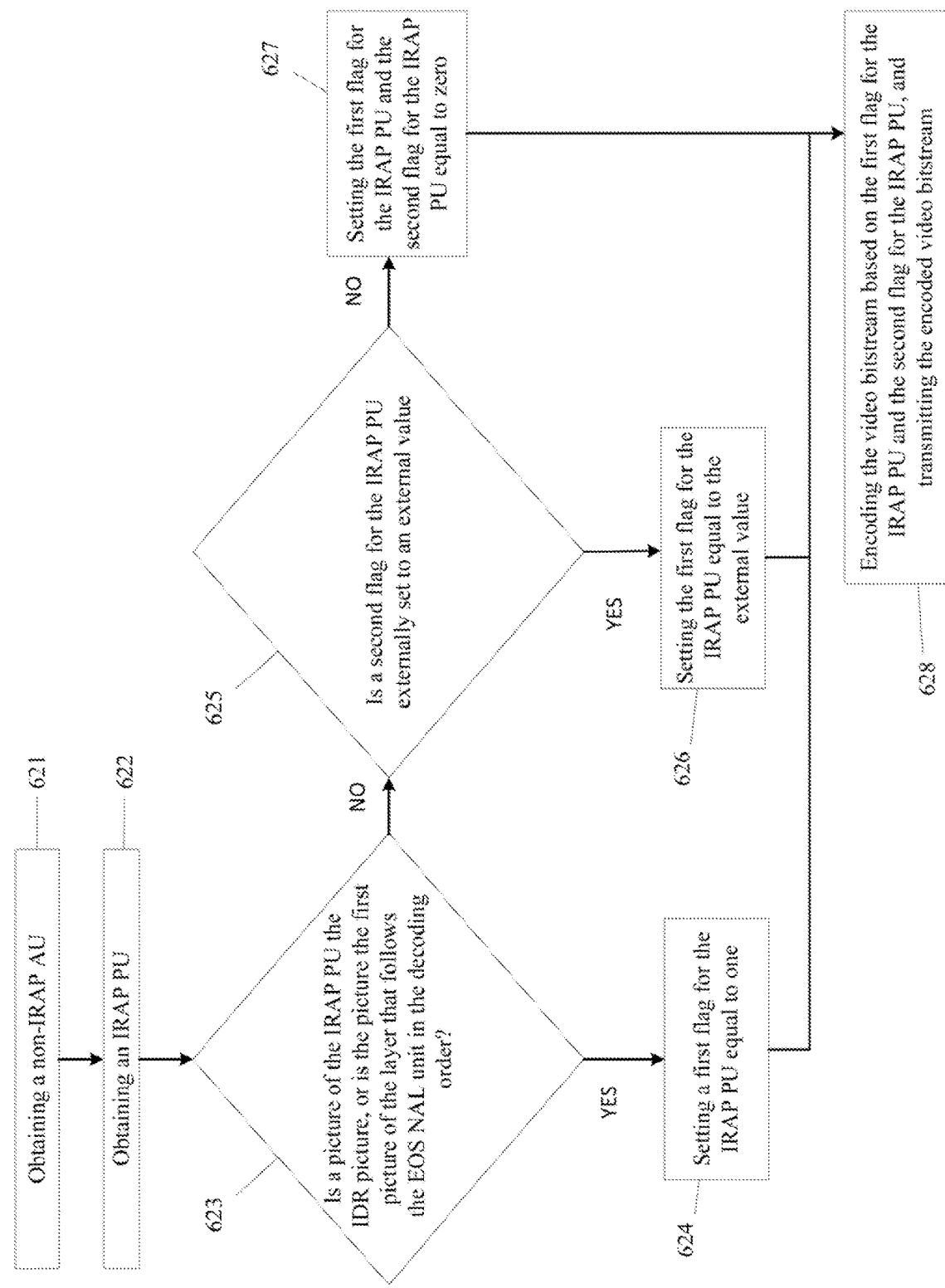

As shown in FIG. 6B, process 600B may include obtaining a non-IRAP AU from a video bitstream (block 621).

As further shown in FIG. 6B, process 600B may include obtaining an IRAP PU from the non-IRAP AU (block 622).

As further shown in FIG. 6B, process 600B may include determining whether a picture corresponding to the IRAP PU is the IDR picture, and whether the picture is the first picture of the layer that follows the EOS NAL unit in the decoding order (block 623).

As further shown in FIG. 6B, if a result of any of the determinations in block 623 is yes (YES at block 623), process 600B may proceed to block 624. However, if a result of all of the determinations in block 623 is no (NO at block 623), process 600B may proceed to block 625.

As further shown in FIG. 6B, process 600B may include setting a first flag for the IRAP PU equal to one (block 624).

As further shown in FIG. 6B, process 600B may include determining whether a second flag for the IRAP PU is externally set to an external value (block 625).

As further shown in FIG. 6B, if the second flag for the IRAP PU is determined to be externally set to the external value (YES at block 625), process 600B may proceed to block 626. However, if the second flag for the IRAP PU is determined not to be externally set to the external value (NO at block 625), process 600B may proceed to block 627.

As further shown in FIG. 6B, process 600B may include setting the first flag for the IRAP PU equal to the external value (block 626).

As further shown in FIG. 6B, process 600B may include setting the first flag for the IRAP PU and the second flag for the IRAP PU equal to zero (block 627).

As further shown in FIG. 6B, process 600B may include encoding the video bitstream based on the first flag for the IRAP PU and the second flag for the IRAP PU, and transmitting the encoded video bitstream (block 628).

Figure 6C:
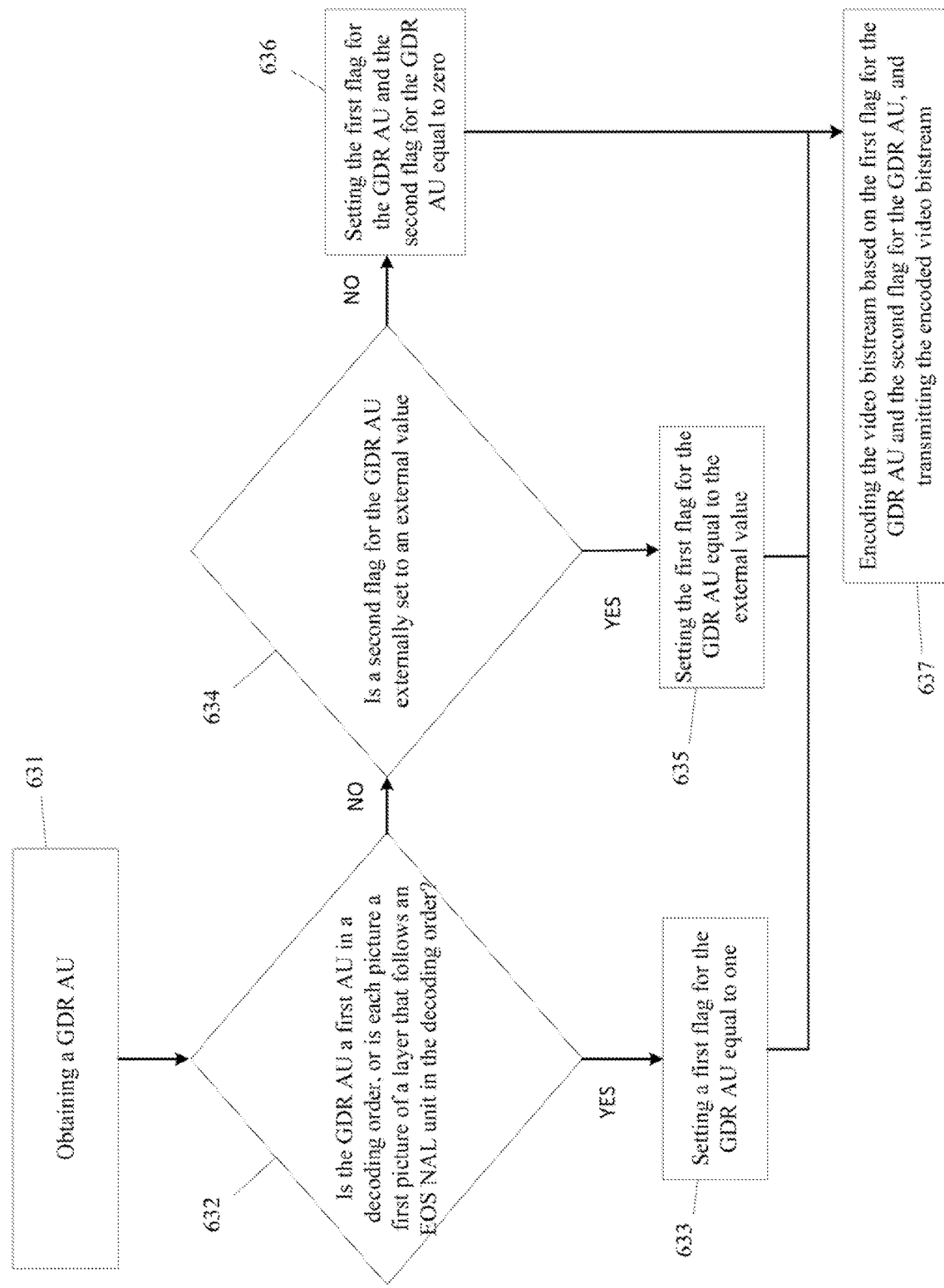

As shown in FIG. 6C, process 600C may include obtaining an intra random access point (IRAP) access unit (AU) from a video bitstream (block 631).

As further shown in FIG. 6C, process 600C may include whether the GDR AU is the first AU in the decoding order, and whether each picture included in the GDR AU is the first picture of the layer that follows the EOS NAL unit in the decoding order (block 632).

As further shown in FIG. 6C, if a result of any of the determinations in block 632 is yes (YES at block 632), process 600C may proceed to block 633. However, if a result of all of the determinations in block 632 is no (NO at block 632), process 600C may proceed to block 634.

As further shown in FIG. 6C, process 600C may include setting a first flag for the GDR AU equal to one (block 633).

As further shown in FIG. 6C, process 600C may include determining whether a second flag for the GDR AU is externally set to an external value (block 634).

As further shown in FIG. 6C, if the second flag for the GDR AU is determined to be externally set to the external value (YES at block 634), process 600C may proceed to block 635. However, if the second flag for the GDR AU is determined not to be externally set to the external value (NO at block 634), process 600C may proceed to block 636.

As further shown in FIG. 6C, process 600C may include setting the first flag for the GDR AU equal to the external value (block 635).

As further shown in FIG. 6C, process 600C may include setting the first flag for the GDR AU and the second flag for the GDR AU equal to zero (block 636).

As further shown in FIG. 6C, process 600C may include encoding the video bitstream based on the first flag for the GDR AU and the second flag for the GDR AU, and transmitting the encoded video bitstream (block 637).

As shown in FIG. 6D, process 600D may include obtaining a non-IRAP AU from a video bitstream (block 641).

As further shown in FIG. 6D, process 600D may include obtaining an GDR PU from the non-GDR AU (block 642).

As further shown in FIG. 6D, process 600D may include determining whether a picture corresponding to the GDR PU is the first picture of the layer that follows the EOS NAL unit in the decoding order (block 643).

As further shown in FIG. 6D, if a result the determination in block 643 is yes (YES at block 643), process 600D may proceed to block 644. However, if the result of the determination in block 643 is no (NO at block 643), process 600D may proceed to block 645.

As further shown in FIG. 6D, process 600D may include setting a first flag for the GDR PU equal to one (block 644).

As further shown in FIG. 6D, process 600D may include determining whether a second flag for the GDR PU is externally set to an external value (block 645).

As further shown in FIG. 6D, if the second flag for the GDR PU is determined to be externally set to the external value (YES at block 645), process 600D may proceed to block 646. However, if the second flag for the GDR PU is determined not to be externally set to the external value (NO at block 645), process 600D may proceed to block 647.

As further shown in FIG. 6D, process 600D may include setting the first flag for the GDR PU equal to the external value (block 646).

As further shown in FIG. 6D, process 600D may include setting the first flag for the GDR PU and the second flag for the GDR PU equal to zero (block 647).

As further shown in FIG. 6D, process 600D may include encoding the video bitstream based on the first flag for the GDR PU and the second flag for the GDR PU, and transmitting the encoded video bitstream (block 648).

In embodiments, the first flag for the IRAP AU being set equal to one may indicate that all random access skipped leading (RASL) pictures associated with a clean random access (CRA) picture included in the IRAP AU should be discarded without being decoded, and the second flag for the IRAP AU being set equal to one may indicate that all leading pictures associated with the CRA picture included in the IRAP AU should be discarded without being decoded.

In embodiments, the first flag for the IRAP AU may include a NoIncorrectPicOutputFlag flag, and the second flag for the IRAP AU may include a HandleCraAsCvsStartFlag flag.

In embodiments the first flag for the GDR AU being set equal to one may indicate that all random access skipped leading (RASL) pictures associated with a GDR picture included in the GDR AU should be discarded without being decoded, and the second flag for the GDR AU being set equal to one may indicate that all leading pictures associated with the GDR picture included in the GDR AU should be discarded without being decoded.

In embodiments, the first flag for the GDR AU may include a NoIncorrectPicOutputFlag flag, and the second flag for the GDR AU may include a HandleGdrAsCvsStartFlag flag.

Although FIGS. 6A-6D show example blocks of processes 600A, 600B, 600C, and 600D, in some implementations, processes 600A, 600B, 600C, and 600D may include additional blocks, fewer blocks, different blocks, or differently arranged blocks than those depicted in FIGS. 6A-6D.

Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710 and associated graphics adapter 750, data-glove 1204, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 1204, or joystick 705, but there can also be tactile feedback devices that do not serve as input devices), audio output devices (such as: speakers 709, headphones (not depicted)), visual output devices (such as screens 710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface(s) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (954) that attached to certain general purpose data ports or peripheral buses (949) (such as, for example universal serial bus (USB) ports of the computer system 700; others are commonly integrated into the core of the computer system 700 by attachment to a system bus as described below (for example Ethernet interface into a PC computer system or cellular network interface into a smartphone computer system). As an example, network 755 may be connected to peripheral bus 749 using network interface 754. Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (954) as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators 744 for certain tasks, and so forth. These devices, along with Read-only memory (ROM) 745, Random-access memory (RAM) 746, internal mass storage such as internal non-user accessible hard drives, solid-state drives (SSDs), and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include peripheral component interconnect (PCI), USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of decoding an encoded video bitstream using at least one processor, the method comprising:
receiving the encoded video bitstream;
obtaining, from the encoded video bitstream, an intra random access point (IRAP) access unit (AU);
determining whether the IRAP AU is a first AU in a decoding order, whether each picture included in the IRAP AU is an instantaneous decoder refresh (IDR) picture, and whether each picture included in the IRAP AU is a first picture of a layer that follows an end of sequence (EOS) network abstraction layer (NAL) unit in the decoding order;

when the IRAP AU is the first AU in the decoding order of the encoded video bitstream, the each picture included in the IRAP AU is the IDR picture, or the each picture included in the IRAP AU is the first picture of the layer that follows the EOS NAL unit in the decoding order, setting a first flag for the IRAP AU equal to one;

when the IRAP AU is not the first AU in the decoding order, the each picture included in the IRAP AU is not the IDR picture, and the each picture included in the IRAP AU is not the first picture of the layer that follows the EOS NAL unit in the decoding order, determining whether a second flag for the IRAP AU is externally set to an external value;

when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag for the IRAP AU is externally set to the external value, setting a value of the first flag for the IRAP AU equal to the external value;

when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag for the IRAP AU is not externally set to the external value, setting the value of the first flag for the IRAP AU equal to zero and setting the second flag for the IRAP AU equal to zero; and decoding each picture in the IRAP AU based on the first flag for the IRAP AU and the second flag for the IRAP AU.

2. The method of claim 1, wherein the first flag for the IRAP AU being set equal to one indicates that all random access skipped leading (RASL) pictures associated with a clean random access (CRA) picture included in the IRAP AU should be discarded without being decoded, and wherein the second flag for the IRAP AU being set equal to one indicates that all leading pictures associated with the CRA picture included in the IRAP AU should be discarded without being decoded.

3. The method of claim 1, wherein the first flag for the IRAP AU comprises a NoIncorrectPicOutputFlag flag, and wherein the second flag for the IRAP AU comprises a HandleCraAsCvsStartFlag flag.

4. The method of claim 1, further comprising:

obtaining a non-IRAP AU from the encoded video bitstream;

obtaining an IRAP picture unit (PU) from the non-IRAP AU;

determining whether a picture corresponding to the IRAP PU is the IDR picture, and whether the picture is the first picture of the layer that follows the EOS NAL unit in the decoding order;

when the picture is the IDR picture or the picture is the first picture of the layer that follows the EOS NAL unit in the decoding order, setting a first flag for the IRAP PU equal to one;

when the picture is not the IDR picture, and the picture is not the first picture of the layer that follows the EOS NAL unit in the decoding order, determining whether a second flag for the IRAP PU is externally set to the external value;

when the picture is not the IDR picture, the picture is not the first picture of the layer that follows the EOS NAL unit in the decoding order, and the second flag for the IRAP PU is externally set to the external value, setting the first flag for the IRAP PU to the external value; and when the picture is not the IDR picture, the picture is not the first picture of the layer that follows the EOS NAL unit in the decoding order, and the second flag for the IRAP PU is not externally set to the external value, setting the first flag for the IRAP PU equal to zero and setting the second flag for the IRAP PU equal to zero, wherein each picture in the IRAP PU is decoded based on the first flag for the IRAP PU and the second flag for the IRAP PU.

5. The method of claim 1, further comprising:

obtaining a gradual decoding refresh (GDR) AU from the encoded video bitstream;

determining whether the GDR AU is the first AU in the decoding order, and whether each picture included in the GDR AU is the first picture of the layer that follows the EOS NAL unit in the decoding order;

when the GDR AU is the first AU in the decoding order of the video bitstream, or the each picture included in the GDR AU is the first picture of the layer that follows the EOS NAL unit in the decoding order, setting a first flag for the GDR AU equal to one;

when the GDR AU is not the first AU in the decoding order and the each picture included in the GDR AU is not the first picture of the layer that follows the EOS NAL unit in the decoding order, determining whether a second flag for the GDR AU is externally set to the external value;

when the GDR AU is not the first AU in the decoding order, the each picture included in the GDR AU is not the first picture of the layer that follows the EOS NAL unit in the decoding order, and the second flag for the GDR AU is externally set to the external value, setting the first flag for the GDR AU equal to the external value; and when the GDR AU is not the first AU in the decoding order, the each picture included in the GDR AU is not the first picture of the layer that follows the EOS NAL unit in the decoding order, and the second flag is not externally set to the external value, setting the first flag for the GDR AU equal to zero and setting the second flag for the GDR AU equal to zero, wherein each picture in the GDR AU is decoded based on the first flag for the GDR AU and the second flag for the GDR AU.

6. The method of claim 5, wherein the first flag for the GDR AU being set equal to one indicates that all random access skipped leading (RASL) pictures associated with a GDR picture included in the GDR AU should be discarded without being decoded, and wherein the second flag for the GDR AU being set equal to one indicates that all leading pictures associated with the GDR picture included in the GDR AU should be discarded without being decoded.

7. The method of claim 1, further comprising:

setting the first flag for the IRAP AU equal to the external value based on determining that the second flag for the IRAP AU is externally set to the external value; and setting the first flag for the IRAP AU equal to zero and setting the second flag for the IRAP AU equal to zero based on determining that the second flag is not externally set to the external value.

8. The method of claim 5, further comprising:
obtaining a non-IRAP AU from the video bitstream;
obtaining a GDR picture unit (PU) from the non-IRAP AU;
determining whether a picture corresponding to the GDR PU is the first picture of the layer that follows the EOS NAL unit in the decoding order;
when the picture is the first picture of the layer that follows the EOS NAL unit in the decoding order, setting a first flag for the GDR PU equal to one;
when the picture is not the first picture of the layer that follows the EOS NAL unit in the decoding order, determining whether a second flag for the GDR PU is externally set to the external value;
when the picture is not the first picture of the layer that follows the EOS NAL unit in the decoding order, and the second flag for the GDR PU is externally set to the external value, setting the first flag for the GDR PU to the external value; and
when the picture is not the first picture of the layer that follows the EOS NAL unit in the decoding order, and the second flag for the GDR PU is not externally set to the external value, setting the first flag for the GDR PU equal to zero and setting the second flag for the GDR PU equal to zero,
wherein each picture in the GDR PU is decoded based on the first flag for the GDR PU and the second flag for the GDR PU.

9. A method of processing video data, the method comprising:
processing, by a decoder, the video data in a bitstream, wherein the bitstream includes an intra random access point (IRAP) access unit (AU); and
a coding of the video data in the bitstream causes the decoder to:
determine whether the IRAP AU is a first AU in a decoding order, whether each picture included in the IRAP AU is an instantaneous decoder refresh (IDR) picture, and whether each picture included in the IRAP AU is a first picture of a layer that follows an end of sequence (EOS) network abstraction layer (NAL) unit in the decoding order;
when the IRAP AU is the first AU in the decoding order of the bitstream, the each picture included in the IRAP AU is the IDR picture, or the each picture included in the IRAP AU is the first picture of the layer that follows the EOS NAL unit in the decoding order, set a first flag for the IRAP AU equal to one;
when the IRAP AU is not the first AU in the decoding order, the each picture included in the IRAP AU is not the IDR picture, and the each picture included in the IRAP AU is not the first picture of the layer that follows the EOS NAL unit in the decoding order, determine whether a second flag for the IRAP AU is externally set to an external value;
when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag for the IRAP AU is externally set to the external value, set a value of the first flag for the IRAP AU equal to the external value;
when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag for the IRAP AU is not externally set to the external value, set the value of the first flag for the IRAP AU equal to zero and the second flag for the IRAP AU equal to zero; and
process each picture in the IRAP AU based on the first flag for the IRAP AU and the second flag for the IRAP AU.

10. The method of claim 9, wherein the first flag for the IRAP AU being set equal to one indicates that all random access skipped leading (RASL) pictures associated with a clean random access (CRA) picture included in the IRAP AU should be discarded without being decoded, and
wherein the second flag for the IRAP AU being set equal to one indicates that all leading pictures associated with the CRA picture included in the IRAP AU should be discarded without being decoded.

11. The method of claim 9, wherein the first flag for the IRAP AU comprises a NoIncorrectPicOutputFlag flag, and
wherein the second flag for the IRAP AU comprises a HandleCraAsCvsStartFlag flag.

12. The method of claim 9, wherein
the bitstream includes a non-IRAP AU; and
the coding specifies that:
an IRAP picture unit (PU) is obtained from the non-IRAP AU;
whether a picture corresponding to the IRAP PU is the IDR picture, and whether the picture is the first picture of the layer that follows the EOS NAL unit in the decoding order is determined;
when the picture is the IDR picture or the picture is the first picture of the layer that follows the EOS NAL unit in the decoding order, a first flag for the IRAP PU is set equal to one;
when the picture is not the IDR picture, and the picture is not the first picture of the layer that follows the EOS NAL unit in the decoding order, whether a second flag for the IRAP PU is externally set to the external value is determined;
when the picture is not the IDR picture, the picture is not the first picture of the layer that follows the EOS NAL unit in the decoding order, and the second flag for the IRAP PU is externally set to the external value, the first flag for the IRAP PU is set to the external value;
when the picture is not the IDR picture, the picture is not the first picture of the layer that follows the EOS NAL unit in the decoding order, and the second flag for the IRAP PU is not externally set to the external value, the first flag for the IRAP PU is set equal to zero and the second flag for the IRAP PU is set equal to zero; and
each picture in the IRAP PU is processed based on the first flag for the IRAP PU and the second flag for the IRAP PU.

13. A method of generating an encoded video bitstream using at least one processor, the method comprising:
obtaining an intra random access point (IRAP) access unit (AU) from a video bitstream;
determining whether the IRAP AU is a first AU in a decoding order, whether each picture included in the IRAP AU is an instantaneous decoder refresh (IDR) picture, and whether the each picture included in the IRAP AU is a first picture of a layer that follows an end of sequence (EOS) network abstraction layer (NAL) unit in the decoding order;

when the IRAP AU is the first AU in the decoding order of the video bitstream, the each picture included in the IRAP AU is the IDR picture, or the each picture included in the IRAP AU is the first picture of the layer that follows the EOS NAL unit in the decoding order, setting a first flag for the IRAP AU equal to one;

when the IRAP AU is not the first AU in the decoding order, the each picture included in the IRAP AU is not the IDR picture, and the each picture included in the IRAP AU is not the first picture of the layer that follows the EOS NAL unit in the decoding order, determining whether a second flag for the IRAP AU is externally set to an external value;

when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag for the IRAP AU is externally set to the external value, setting the first flag for the IRAP AU equal to the external value;

when the IRAP AU is not the first AU in the decoding order, the each picture included in the IRAP AU is not the IDR picture, the each picture included in the IRAP AU is not the first picture of the layer that follows the EOS NAL unit in the decoding order, and the second flag is not externally set to the external value, setting the first flag for the IRAP AU equal to zero and setting the second flag for the IRAP AU equal to zero; and encoding the video bitstream based on the first flag for the IRAP AU and the second flag for the IRAP AU.

14. The method of claim 13, wherein the first flag for the IRAP AU being set equal to one indicates that all random access skipped leading (RASL) pictures associated with a clean random access (CRA) picture included in the IRAP AU should be discarded without being decoded, and wherein the second flag for the IRAP AU being set equal to one indicates that all leading pictures associated with the CRA picture included in the IRAP AU should be discarded without being decoded.

15. The method of claim 13, wherein the first flag for the IRAP AU comprises a NoIncorrectPicOutputFlag flag, and wherein the second flag for the IRAP AU comprises a HandleCraAsCvsStartFlag flag.

16. The method of claim 13, further comprising:

obtaining a non-IRAP AU from the video bitstream;

obtaining an IRAP picture unit (PU) from the non-IRAP AU;

determining whether a picture corresponding to the IRAP PU is the IDR picture, and whether the picture is the first picture of the layer that follows the EOS NAL unit in the decoding order;

when the picture is the IDR picture or the picture is the first picture of the layer that follows the EOS NAL unit in the decoding order, setting a first flag for the IRAP PU equal to one;

when the picture is not the IDR picture, and the picture is not the first picture of the layer that follows the EOS NAL unit in the decoding order, determining whether a second flag for the IRAP PU is externally set to the external value;

when the picture is not the IDR picture, the picture is not the first picture of the layer that follows the EOS NAL unit in the decoding order, and the second flag for the IRAP PU is externally set to the external value, setting the first flag for the IRAP PU to the external value;

when the picture is not the IDR picture, the picture is not the first picture of the layer that follows the EOS NAL unit in the decoding order, and the second flag for the IRAP PU is not externally set to the external value, setting the first flag for the IRAP PU equal to zero and setting the second flag for the IRAP PU equal to zero, wherein the video bitstream is further encoded based on the first flag for the IRAP PU and the second flag for the IRAP PU.

17. The method of claim 13, further comprising:

obtaining a gradual decoding refresh (GDR) AU from the video bitstream;

determining whether the GDR AU is the first AU in the decoding order, and whether each picture included in the GDR AU is the first picture of the layer that follows the EOS NAL unit in the decoding order;

when the GDR AU is the first AU in the decoding order of the video bitstream, or the each picture included in the GDR AU is the first picture of the layer that follows the EOS NAL unit in the decoding order, setting a first flag for the GDR AU equal to one;

when the GDR AU is not the first AU in the decoding order and the each picture included in the GDR AU is not the first picture of the layer that follows the EOS NAL unit in the decoding order, determining whether a second flag for the GDR AU is externally set to the external value;

when the GDR AU is not the first AU in the decoding order, the each picture included in the GDR AU is not the first picture of the layer that follows the EOS NAL unit in the decoding order, and the second flag for the GDR AU is externally set to the external value, setting the first flag for the GDR AU equal to the external value; and when the GDR AU is not the first AU in the decoding order, the each picture included in the GDR AU is not the first picture of the layer that follows the EOS NAL unit in the decoding order, and the second flag is not externally set to the external value, setting the first flag for the GDR AU equal to zero and setting the second flag for the GDR AU equal to zero, wherein the video bitstream is further encoded based on the first flag for the GDR AU and the second flag for the GDR AU.

18. The method of claim 17, wherein the first flag for the GDR AU being set equal to one indicates that all random access skipped leading (RASL) pictures associated with a GDR picture included in the GDR AU should be discarded without being decoded, and wherein the second flag for the GDR AU being set equal to one indicates that all leading pictures associated with the GDR picture included in the GDR AU should be discarded without being decoded.

19. The method of claim 17, wherein the first flag for the GDR AU comprises a NoIncorrectPicOutputFlag flag, and wherein the second flag for the GDR AU comprises a HandleGdrAsCvsStartFlag flag.

20. The method of claim 17, further comprising:

obtaining a non-IRAP AU from the video bitstream;

obtaining a GDR picture unit (PU) from the non-IRAP AU;

determining whether a picture corresponding to the GDR PU is the first picture of the layer that follows the EOS NAL unit in the decoding order;

when the picture is the first picture of the layer that follows the EOS NAL unit in the decoding order, setting a first flag for the GDR PU equal to one;

when the picture is not the first picture of the layer that follows the EOS NAL unit in the decoding order, determining whether a second flag for the GDR PU is externally set to the external value;

when the picture is not the first picture of the layer that follows the EOS NAL unit in the decoding order, and the second flag for the GDR PU is externally set to the external value, setting the first flag for the GDR PU to the external value;

when the picture is not the first picture of the layer that follows the EOS NAL unit in the decoding order, and the second flag for the GDR PU is not externally set to the external value, setting the first flag for the GDR PU equal to zero and setting the second flag for the GDR PU equal to zero, wherein the video bitstream is further encoded based on the first flag for the GDR PU and the second flag for the GDR PU.

* * * * *